United States Patent [19]

Neeff et al.

[11] 4,309,221

[45] Jan. 5, 1982

[54] ANTHRAQUINONE DERIVATIVES

[75] Inventors: Rütger Neeff; Meinhard Rolf; Walter Müller, all of Leverkusen, Fed. Rep. of Germany

[73] Assignee: Bayer Aktiengesellschaft, Leverkusen, Fed. Rep. of Germany

[21] Appl. No.: 39,852

[22] Filed: May 17, 1979

[30] Foreign Application Priority Data

May 24, 1978 [DE] Fed. Rep. of Germany ....... 2822632

[51] Int. Cl.$^3$ .................... C08L 1/24; C07C 123/00; C07C 143/665
[52] U.S. Cl. .................................. 106/164; 260/377; 260/378; 260/372; 260/37 NP; 562/440
[58] Field of Search ................... 260/378, 377, 559 S, 260/396, 37NP, 372; 562/440; 106/164

[56] References Cited

U.S. PATENT DOCUMENTS 3,328,385  6/1967  Loeffel et al. ...................... 260/377
4,131,733  12/1978  Hanger ................................ 562/440

FOREIGN PATENT DOCUMENTS 2093270  12/1972  France ............................... 562/440

OTHER PUBLICATIONS

]Hackh's Chemical Dictionary, Julius Grant, pp. 50-51, McGraw-Hill Book Co., 1972.

Primary Examiner—Winston A. Douglas
Assistant Examiner—Raymond K. Covington
Attorney, Agent, or Firm—Sprung, Felfe, Horn, Lynch & Kramer

[57] ABSTRACT

Anthraquinone derivatives of the formula $$A \left[ NH-CH= \underset{\underset{\displaystyle}{\text{naphthoquinone}}}{\overset{O \quad CO-R_1}{\phantom{X}}} \right]_m \quad (I)$$

or of the tautomeric formula $$A \left[ N=CH- \underset{\underset{\displaystyle}{\text{naphthol}}}{\overset{HO \quad CO-R_1}{\phantom{X}}} \right]_m \quad (Ia)$$

in which
A denotes an anthraquinone radical which is free from sulphonic acid groups and is optionally further substituted and which preferably consists of at most 5 fused rings,
m denotes an integer, preferably 1 or 2, and
$R_1$ denotes a hydroxyl group or a radical of the formula $$-HN-\underset{(II)}{\text{phenyl}}(R_2)_n \quad \text{or} \quad -HN-\underset{(III)}{\text{naphthyl}}(R_2)_n$$

wherein
$R_2$ represents a substituent and
n represents 0, 1, 2, 3 or 4, processes for their preparation, their use for pigmenting organic macromolecular substances and the material pigmented in this manner.

10 Claims, No Drawings

ANTHRAQUINONE DERIVATIVES

The invention relates to anthraquinone derivatives of the formula

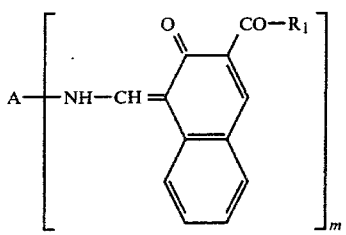

or of the tautomeric formula

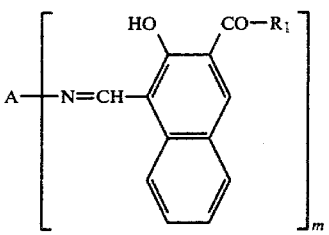

processes for their preparation and their use for pigmenting organic macromolecular substances.

In the formula I,
A denotes an anthraquinone radical which is free from sulphonic acid groups and is optionally further substituted and which preferably consists of at most 5 fused rings,
m denotes an integer, preferably 1 or 2, and
$R_1$ denotes a hydroxyl group or a radical of the formula

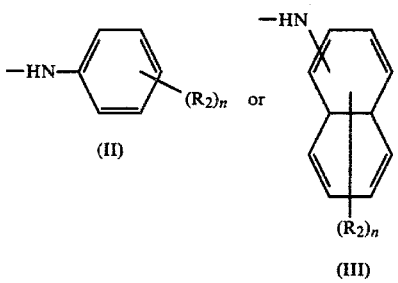

wherein
$R_2$ denotes a substituent and
n denotes 0, 1, 2, 3 or 4.

Examples of suitable substituents $R_2$ are halogen, such as chlorine and bromine, $C_1$–$C_4$-alkyl, $C_1$–$C_4$-alkoxy, nitro, trifluoromethyl, cyano, optionally substituted carbamoyl and optionally substituted sulphamoyl, acylamino, arylamino, $C_1$–$C_4$-alkylsulphonylamino, phenylsulphonylamino which is optionally substituted by $C_1$–$C_4$-alkyl, $C_1$–$C_4$-alkoxy, fluorine, chlorine, bromine or nitro, or correspondingly substituted benzylsulphonylamino.

Possible substituents of the carbamoyl and sulphamoyl groups are $C_1$–$C_4$-alkyl, phenyl which is optionally substituted by $C_1$–$C_4$-alkyl, $C_1$–$C_4$-alkoxy, fluorine, chlorine, bromine or nitro and benzyl. Acyl groups which may be mentioned in particular are $C_1$–$C_4$-alkylcarbonyl and benzoyl which is optionally substituted in the benzene nucleus by chlorine, $C_1$–$C_4$-alkyl, $C_1$–$C_4$-alkoxy or nitro. Arylamino is, in particular, phenylamino which is optionally substituted by $C_1$–$C_4$-alkyl, $C_1$–$C_4$-alkoxy, fluorine, chlorine, bromine or nitro.

Preferred anthraquinone derivatives correspond to the formula

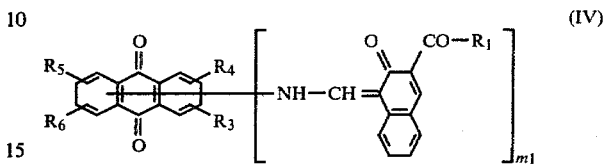

wherein
$R_1$ has the meaning indicated above,
$m_1$ represents an integer between 1 and 4, preferably 1 or 2,
$R_3$ denotes hydrogen, halogen, such as fluorine, chlorine and bromine, nitro, $C_1$–$C_4$-alkyl, $C_1$–$C_4$-alkoxy, $C_1$–$C_4$-alkylamino, benzylamino, cyclohexylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, $C_1$–$C_4$-alkylcarbonyl, $C_1$–$C_4$-alkoxycarbonyl, phenylamino which is optionally substituted by $C_1$–$C_4$-alkyl, $C_1$–$C_4$-alkoxy, chlorine or nitro, carbamoyl which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine, bromine or nitro, carboxyl, hydroxyl, $C_1$–$C_4$-alkylcarbonylamino, benzoylamino which is optionally substituted by $C_1$–$C_4$-alkyl, $C_1$–$C_4$-alkoxy, chlorine, bromine or nitro, $C_1$–$C_4$-alkylsulphonylamino or phenylsulphonylamino which is optionally substituted by $C_1$–$C_4$-alkyl, $C_1$–$C_4$-alkoxy, fluorine, chlorine, bromine or nitro,
$R_4$ denotes hydrogen, chlorine or hydroxyl,
$R_5$ denotes hydrogen, halogen, such as fluorine, chlorine or bromine, nitro, $C_1$–$C_4$-alkyl, $C_1$–$C_4$-alkoxy, $C_1$–$C_4$-alkylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, $C_1$–$C_4$-alkoxycarbonyl $C_1$–$C_4$-alkylcarbonyl, benzylamino, cyclohexylamino, phenylamino which is optionally substituted by $C_1$–$C_4$-alkyl, $C_1$–$C_4$-alkoxy, chlorine, bromine or nitro, carboxyl, hydroxyl, carbamoyl which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine, bromine or nitro, $C_1$–$C_4$-alkylcarbonylamino, benzoylamino which is optionally substituted by $C_1$–$C_4$-alkyl, $C_1$–$C_4$-alkoxy, chlorine, bromine or nitro, $C_1$–$C_4$-alkylsulphonylamino or phenylsulphonylamino which is optionally substituted by $C_1$–$C_4$-alkyl, $C_1$–$C_4$-alkoxy, fluorine, chlorine, bromine or nitro, and
$R_6$ denotes hydrogen, halogen, such as fluorine, chlorine and bromine, or hydroxyl.

Anthraquinone pigments of the formula

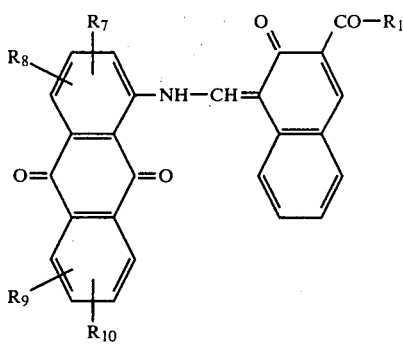
(V)

wherein
R₁ has the meaning indicated above and
R₇, R₈, R₉ and R₁₀ designate hydrogen, chlorine, bromine, carboxyl, hydroxyl, $C_1$-$C_4$-alkoxycarbonyl, carbmoyl, $C_1$-$C_4$-alkylcarbonylamino, benzoylamino which is optionally substituted by 1 or 2 nitro groups or 1 to 5 chlorine or bromine atoms, $C_1$-$C_4$-alkylsulphonylamino, phenylsulphonylamino which is optionally substituted by methyl, methoxy or chlorine or a radical of the formula

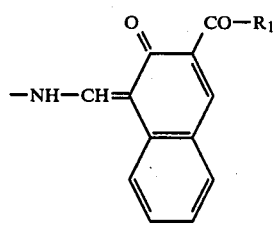
(VI)

in which
R₁ has the meaning indicated above, are particularly preferred.

The anthraquinone derivatives (I) are prepared from amino-anthraquinones of the formula

A-(NH₂)ₘ  (VII)

and 3-hydroxy-2-naphthoic acid or the 3-hydroxy-2-naphthoic acid arylides of the formula

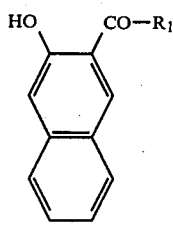
(VIII)

in which R₁ has the meaning indicated above.

The preparation can be carried out by several processes.

(1) 3-Hydroxy-2-naphthoic acid or the 3-hydroxy-2-naphthoic acid arylides of the formula (VIII) are subjected to condensation reactions with an orthoformic acid trialkyl ester of the formula

HC(OR)₃  (IX)

in which R preferably represents a $C_1$-$C_4$-alkyl group, at 100°-220° C. in an organic solvent which is inert towards the reactants, and the resulting 4-alkoxy-methylene-3-oxo-3,4-dihydro-2-naphthoic acid or 4-alkoxy-methylene-3-oxy-3,4-dihydro-2-naphthoic acid arylides of the formula

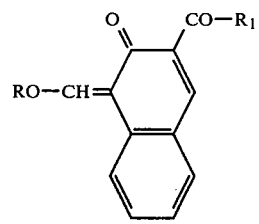
(X)

in which R₁ has the meaning indicated above, are then reacted with an amino-anthraquinone of the formula

A-(NH₂)ₘ  (VII)

in the same reaction medium or in another organic reaction medium at 100°-220° C., preferably 120°-180° C.

(2) The amino-anthraquinones of the formula

A-(NH₂)ₘ  (VII)

are subjected to condensation reactions with an orthoformic acid trialkyl ester of the abovementioned formula (IX) at 100°-220° C., preferably 120°-180° C., in an organic solvent which is inert towards the reactants and the resulting formiminoesters of the formula

A-(N=CH-OR)ₘ  (XI)

in which
A and m have the meaning indicated above, and in which
R preferably represents a $C_1$-$C_4$-alkyl group, are then reacted with 3-hydroxy-2-naphthoic acid or 3-hydroxy-2-naphthoic acid arylides of the abovementioned formula (VIII) in the same reaction medium or in another organic reaction medium at 100°-220° C., preferably 120°-180° C.

Suitable organic solvents for processes (1) and (2) are aromatic and hetero-aromatic compounds, such as toluene, chlorobenzene, pyridine, o-dichlorobenzene, 1,2,4-trichlorobenzene or nitrobenzene, alcohols, such as butanol or diethylene glycol monomethyl ether, ethers, such as ethylene glycol dimethyl ether or ethylene glycol diethyl ether, or dipolar aprotic solvents, such as dimethylformamide, dimethylacetamide, N-methylpyrrolidone, tetramethyl urea, dimethylsulphoxide or tetramethylene sulphone.

(3) In another process, the amino-anthraquinones of the formula

A-(NH₂)ₘ  (VII)

are converted into the corresponding formamidinium halides of the formula

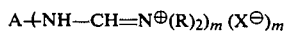
A-(NH-CH=N⊕(R)₂)ₘ (X⊖)ₘ  (XII)

in which
A and m have the meaning indicated above, and wherein
R preferably represents a $C_1$-$C_4$-alkyl group and X represents chlorine or bromine,
with a dialkylformamide and a thionyl halide, in particular thionyl chloride, at 40°–100° C., preferably 40°–80° C., in an organic solvent which is inert towards the reactants, and the resulting formamidinium halides (XII) are subjected to condensation reactions with 3-hydroxy-2-naphthoic acid or 3-hydroxy-2-naphthoic acid arylides of the formula (VIII) in the same solvent or in another organic solvent at 100°–220° C., preferably 120°–180° C., in the presence of an acid-binding agent.

Suitable organic solvents for process (3) are, in particular, aromatic hydrocarbons, such as toluene, chlorobenzene, o-dichlorobenzene, 1,2,4-trichlorobenzene or nitrobenzene, ethers, such as ethylene glycol dimethyl ether or ethylene glycol diethyl ether, or dipolar aprotic solvents, such as dimethylformamide, diethylformamide, N-methylpyrrolidone, dimethylsulphoxide or tetramethylene sulphone.

Lower dialkylformamides, such as dimethylformamide or diethylformamide, are preferably used as the dialkylformamides, but it is also possible to employ cyclic alkylcarboxylic acid amides, such as N-methylpyrrolidone.

Alkali metal hydroxides or carbonates or alkaline earth metal hydroxides or carbonates or alkali metal salts of aliphatic carboxylic acids, or alkaline earth metal salts of aliphatic carboxylic acids, preferably sodium carbonate, bicarbonate or acetate or potassium carbonate, bicarbonate or acetate, are used as the acid-binding agents in process (3).

Suitable amino-anthraquinones of the formula

  (VII)

wherein m has the meaning indicated above,
are: 1-aminoanthraquinone, 2-aminoanthraquinone, 1-amino-2-chloranthraquinone, 1-amino-4-chloroanthraquinone, 1-amino-5-chloroanthraquinone, 1-amino-6-chloroanthraquinone, 1-amino-6- and -7-chloroanthraquinone (mixture), 1-amino-5,8-dichloroanthraquinone, 1-amino-2-bromoanthraquinone, 1-amino-2,4-dibromoanthraquinone, 1-amino-6,7-dichloroanthraquinone, 1-amino-6-fluoroanthraquinone, 1-amino-7-fluoroanthraquinone, 1-amino-6,7-difluoroanthraquinone, 2-amino-1-chloroanthraquinone, 2-amino-3-chloroanthraquinone, 2-amino-3-bromoanthraquinone, 1-amino-4-nitroanthraquinone, 1-amino-5-nitroanthraquinone, 1-amino-2-methylanthraquinone, 1-amino-2-methyl-4-chloroanthraquinone, 1-amino-2-methyl-4-bromoanthraquinone, 1-aminoanthraquinone-2-carboxylic acid, 1-aminoanthraquinone-2-carboxylic acid amide, 1-aminoanthraquinone-2-carboxylic acid methyl ester, 1-amino-4-nitroanthraquinone-2-carboxylic acid, 1-amino-2-acetylanthraquinone, 1-amino-5-benzoylaminoanthraquinone, 1-amino-4-benzoylaminoanthraquinone, 1-amino-4-hydroxyanthraquinone, 1-amino-5-hydroxyanthraquinone, 1-amino-4-methoxyanthraquinone, 1-amino-2-methoxy-4-hydroxyanthraquinone, 1-amino-4-methylaminoanthraquinone, 1-amino-4-cyclohexylaminoanthraquinone, 1-amino-4-anilinoanthraquinone, 1-amino-6-methylmercaptoanthraquinone, 2-phenyl-6-amino-4,5-phthaloylbenzimidazole, 6-chloro-2-amino-3,4-phthaloylacridone, 7-chloro-2-amino-3,4-phthaloylacridone, 5-chloro-8-amino-3,4-phthaloylacridone, 3-methyl-6-amino-anthrapyridone, 3-methyl-7-amino-anthrapyridone, 4-amino-1,9-pyrazolanthrone, 5-amino-1,9-pyrazolanthrone, 4-amino-1,9-anthrapyrimidine, 5-amino-1,9-anthrapyrimidine, 1,5-diaminoanthraquinone, 1,4-diaminoanthraquinone, 1,8-diaminoanthraquinone, 2,6-diaminoanthraquinone, 1,5-diamino-4-chloroanthraquonine, 1,4-diamino-5-nitroanthraquinone, 1,5-diamino-2,4,6,8-tetrabromoanthraquinone, 1,5-diamino-4,8-dihydroxyanthraquinone, 1,8-diamino-4,5-dihydroxyanthraquinone, 4,4'-diamino-1,1'-dianthrimide, 1-amino-8-benzoylaminoanthraquinone and 1-amino-2-bromo-4-(4-methylphenylsulphonylamino)-anthraquinone.

The compounds of the formula I obtainable by processes (1)–(3) are obtained in a form suitable for use as pigments or they can be converted into a suitable form by after-treatment processes which are in themselves known, for example by dissolving or swelling in strong inorganic acids, such as sulphuric acid, and discharging the mixture onto ice. Fine division can also be achieved by grinding, with or without grinding auxiliaries, such as inorganic salts or sand, if appropriate in the presence of solvents, such as toluene, xylene, dichlorobenzene or N-methylpyrrolidone. The tinctorial strengthh and transparency of the pigment can be influenced by varying the after-treatment.

Because of their fastness to light and migration, the pigments of the formula I are suitable for the most diverse pigment applications. The pigments according to the invention can be used for the preparation of pigmented systems with very good fastness properties, such as mixtures with other substances, formulations, paints, printing pastes, coloured paper and coloured macromolecular substances. By mixture with other substances there may be understood, for example, mixtures with inorganic white pigments, such as titanium dioxide (rutile), or with cement. Formulations are, for example, flush pastes with organic liquids or pastes and fine pastes with water, dispersing agents and, if appropriate, preservatives. The term paint represents, for example, lacquers which dry physically or by oxidation, stoving lacquers, reactive lacquers, two-component lacquers, emulsion paints for weather-resistant coatings and distempers. By printing pastes there are to be understood those for paper printing, textile printing and tin-plate printing. The macromolecular substances can be of natural origin, such as rubber, or they can be obtained by chemical modification, such as acetylcellulose, cellulose butyrate or viscose or be synthetically produced, such as polymers, polyaddition products and polycondensates. Substances which may be mentioned are plastic compositions, such as polyvinyl chloride, polyvinyl acetate, polyvinyl propionate, polyolefines, for example polyethylene, or polyamides, high molecular weight polyamides, polymers and copolymers of acrylic ester, methacrylic esters, acrylonitrile, acrylamide, butadiene and styrene, and polyurethanes and polycarbonates. The substances pigmented with the products claimed can be in any desired form.

The pigments according to the invention are furthermore outstandingly fast to water, fast to oil, fast to acid, fast to lime, fast to alkali, fast to solvents, fast to overlacquering, fast to overspraying, fast to sublimation, resistant to heat and resistant to vulcanisation, and they have a very high tinctorial strength and can easily be distributed in plastic compositions.

EXAMPLE 1

(a) 11 g of 97% pure 1-amino-anthraquinone, 8.5 g of orthoformic acid triethyl ester and 120 g of nitrobenzene are stirred at 140°–145° C. for about 3 hours, during which the ethanol formed is distilled off over a bridge and the formation of the formimino-ester of the formula

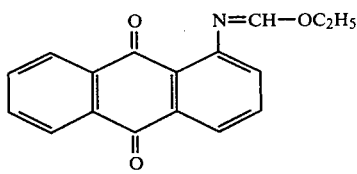 (XIII)

is followed by thin layer chromatography. After the 1-amino-anthraquinone has disappeared, 16 g of 3-hydroxy-2-naphthoic acid 1-naphthylamide are added to the reaction mixture and the mixture is heated to 145°-150° C. for a further 2-3 hours. Thereafter, it is allowed to cool to 100° C. and the pigment, which has crystallised out as red needles, is filtered off, washed with hot nitrobenzene and methanol and dried at 100° C. 22.9 g (85% of theory) of the luminously bluish-tinged red pigment of the formula

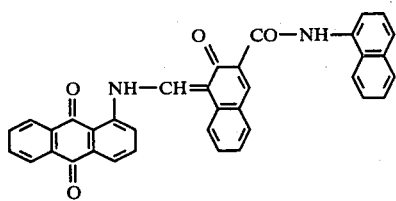 (XIV)

are thus obtained.

$C_{36}H_{22}N_2O_4$ (546): Calculated: C 79.12; H 4.03; N 5.13; O 11.72. Found: C 79.3; H 3.9; N 5.3; O 11.9.

The pigment can also be present in the following tautomeric form:

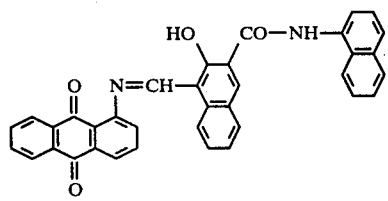 (XIVa)

but, on the basis of investigations by mass spectroscopy and nuclear magnetic resonance spectroscopy, preference is given to formula (XIV).

(b) 7.3 g of thionyl chloride are added to 11 g of 97% pure 1-amino-anthraquinone, 4 g of dimethylformamide and 90 g of nitrobenzene at 50°-60° C. in the course of 1 hour and the mixture is stirred for about a further 1 hour until the formamidinium chloride of the formula

 (XV)

has formed. The mixture is subsequently stirred for a further 1 hour in vacuo in order to remove excess thionyl chloride, 16 g of 3-hydroxy-2-naphthoic acid 1-naphthylamide and 12.5 g of anhydrous sodium acetate are then added successively to the reaction mixture and the mixture is heated to 150°-160° C. in the course of about 1 hour. It is stirred at 150°-160° C. until the formation of the pigment, which has crystallised as red needles, has ended, the pigment is then filtered off at 100° C. and washed with hot nitrobenzene and with methanol and water and, after drying, 22.1 g (82% of theory) of the red pigment, which is identical to that from Example 1a, are obtained.

Using 3-hydroxy-2-naphthoic acid or the 3-hydroxy-2-naphthoic acid arylides of the formula (VIII)

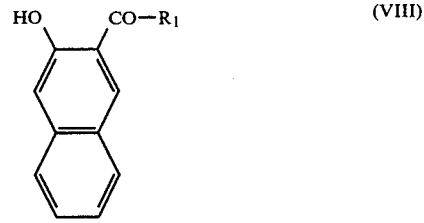 (VIII)

listed in the table which follows, and 1-amino-anthraquinone, anthraquinone pigments correspnding to that of the formula (XIV) with the colour shades indicated are obtained by the processes described in Example 1a or 1b;

TABLE 1

| Example | $R_1$ | Colour shade |
|---|---|---|
| 2 | OH | bluish-tinged red |
| 3 | —NH—C₆H₅ | yellowish-tinged orange |
| 4 | —NH—C₆H₄—OCH₃ | reddish-tinged orange |
| 5 | —NH—C₆H₄—OC₂H₅ | reddish-tinged orange |
| 6 | —NH—C₆H₄—CH₃ | orange |
| 7 | —NH—C₆H₄(CH₃) | reddish-tinged orange |
| 8 | —NH—C₆H₄(NO₂) | reddish-tinged grey |
| 9 | —NH—C₆H₃(OCH₃)(Cl)(OCH₃) | orange |
| 10 | —NH—naphthyl | orange |
| 11 | —NH—C₆H₄—Br | yellowish-tinged orange |
| 12 | —NH—C₆H₄—F | yellowish-tinged orange |
| 13 | —NH—C₆H₄—CF₃ | yellowish-tinged orange |
| 14 | —NH—C₆H₄—NH—CO—CH₃ | orange |

TABLE 1-continued

| Example | R₁ | Colour shade |
|---|---|---|
| 15 | —NH—(2,3-dichlorophenyl) | reddish-tinged orange |
| 16 | —NH—C₆H₄—CO—NH₂ | orange |
| 17 | —NH—C₆H₄—SO₂—NH—C₆H₅ | orange |
| 18 | —NH—C₆H₄—CN | orange |

Pigments with excellent properties and similar colour shades are obtained when the 1-amino-anthraquinone derivatives which follow are employed in Examples 1–18 instead of the 1-amino-anthraquinone used therein: 1-amino-4-chloro-anthraquinone, 1-amino-5-chloro-anthraquinone, 1-amino-6- and -7-chloro-anthraquinone, 1-amino-6,7-dichloroanthraquinone, 1-amino-2,4-dibromo-anthraquinone, 1-amino-6-fluoro-anthraquinone, 1-amino-4-nitro-anthraquinone, 1-amino-5-nitro-anthraquinone, 1-amino-anthraquinone-2-carboxylic acid amide and 1-amino-2-acetyl-anthraquinone.

EXAMPLE 19

17 g of 87% pure 1-amno-5-benzoylamino-anthraquinone and 8.5 g of orthoformic acid triethyl ester are heated to 140°–150° C. in 180 g of nitrobenzene for about 2–3 hours, during which the ethanol formed is distilled off over a short bridge. When the starting material has disappeared, 20 g of 91% pure 3-hydroxy-2-naphthoic acid 4-chloro-2,5-dimethoxy-anilide are introduced and the mixture is heated to 145°–150° C. for a further 4 hours. After cooling to 100° C., the pigment, which has crystallised as bluish-tinged red needles, is filtered off and washed with hot nitrobenzene and methanol, and, after drying at 100° C., 31.5 g (89% of theory) of the bluish-tinged red pigment of the formula

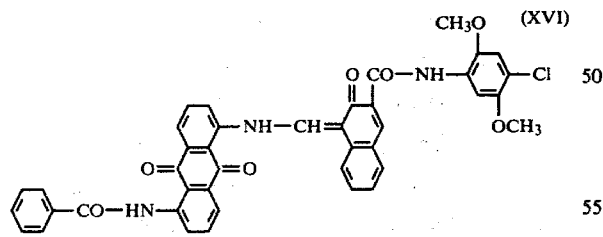

are obtained.

Calculated: N 5.91. Found: N 6.05.

Instead of orthoformic acid triethyl ester, orthoformic acid trimethyl ester can be employed in the example, with the same success.

The pigment is obtained in similar yields when the solvents which follow are used instead of nitrobenzene: o-dichlorobenzene, 1,2,4-trichlorobenzene, diethylene glycol monoethyl ether, diethylene glycol dimethyl ether, dimethylformamide, N-methylpyrrolidone, dimethylsulphoxide and tetramethylene sulphone.

Using 3-hydroxy-2-naphthoic acid or the 3-hydroxy-2-naphthoic acid arylides of the formula (VIII)

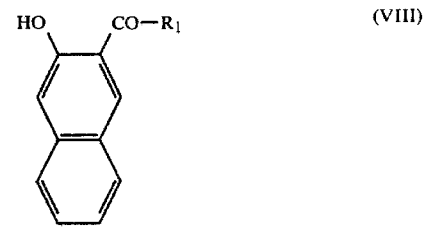

listed in the table which follows, and 1-amino-5-benzoylaminoanthraquinone, anthraquinone pigments corresponding to that of the formula XVI with the colour shades indicated are obtained by the process described in Example 19;

TABLE 2

| Example | R₁ | Colour shade |
|---|---|---|
| 20 | OH | red |
| 21 | —NH—C₆H₅ | bluish-tinged red |
| 22 | —NH—C₆H₄—CH₃ | red |
| 23 | —NH—C₆H₄—C₂H₅ | bluish-tinged red |
| 24 | —NH—(dichlorophenyl) | red |
| 25 | —NH—naphthyl | red |
| 26 | —NH—naphthyl | yellowish-tinged red |
| 27 | —NH—C₆H₄—NO₂ | grey-black |

EXAMPLE 28

15.6 g of 95% pure 1-amino-4-benzoylamino-anthraquinone and 8.5 g of orthoformic acid triethyl ester are heated to 140°–150° C. in 200 g of o-dichlorobenzene for about 2–3 hours, during which the ethanol formed is distilled off over a short bridge. When the starting material has disappeared, 13.4 g of 3-hydroxy-2-naphthoic acid anilide are introduced and the mixture is heated to 140°–150° C. for a further 4 hours. After cooling to 100° C., the pigment, which has crystallised as attractive brown-red needles, is filtered off and washed with hot o-dichlorobenzene and methanol, and, after drying at 100° C., 23.5 g (88.2% of theory) of the violet pigment of the formula

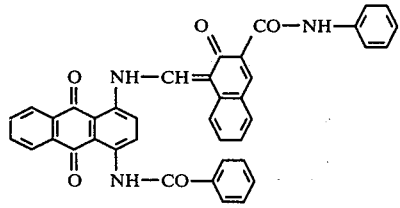

(XVII)

are obtained.

Calculated: N 6.82. Found: N 6.98.

Pigments with excellent properties and similar colour shades are obtained when 1-amino-4-(4-chlorobenzoylamino)-anthraquinone, 1-amino-4-(2,4-dichlorobenzoylamino)anthraquinone, 1-amino-4-(3-nitrobenzoylamino)-anthraquinone or 1-amino-4-(4-acetylaminobenzoylamino)-anthraquinone is used instead of the abovementioned 1-amino-4-benzoylaminoanthraquinone.

EXAMPLE 29

12 g of 1-amino-4-hydroxy-anthraquinone, 8.5 g of orthoformic acid triethyl ester and 120 g of nitrobenzene are stirred at 140°–145° C. for about 3 hours, during which the ethanol formed is distilled off over a bridge. When the starting material has disappeared, 13.4 g of 3-hydroxy-2-naphthoic acid anilide are introduced and the mixture is heated to 140°–150° C. for a further 4 hours. After cooling to 100° C., the pigment, which has crystallised as attractive blue-red needles, is filtered off and washed with hot nitrobenzene and methanol, and, after drying at 100° C., 22.4 g (87.2% of theory) of the violet pigment of the formula

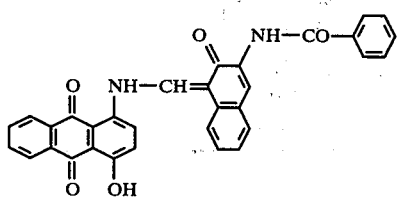

(XVIII)

are obtained.

Calculated: N 5.47; O 15.63. Found: N 5.37; O 15.60.

Using 3-hydroxy-2-naphthoic acid or the 3-hydroxy-2-naphthoic acid arylides of the formula (VIII)

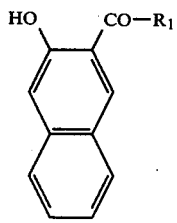

(VIII)

listed in the table which follows, and 1-amino-4-hydroxy-anthraquinone, anthraquinone pigments corresponding to that of the formula XVIII with the colour shades indicated are obtained by the process described in Example 29:

TABLE 3

| Example | R₁ | Colour shade |
|---|---|---|
| 30 | OH | violet |
| 31 | —HN—⟨⟩—OC₂H₅ | reddish-tinged violet |
| 32 | —HN—⟨⟩—CH₃ | reddish-tinged violet |
| 33 | —HN—⟨⟩ with CH₃ | bluish-tinged violet |
| 34 | —HN—⟨⟩ with CH₃O, Cl, OCH₃ | bluish-tinged grey |
| 35 | —HN—⟨⟩—NO₂ | grey |
| 36 | —HN—⟨naphthyl⟩ | reddish-tinged grey |
| 37 | —HN—⟨⟩—NO₂ with Cl | violet |

EXAMPLE 38

5.9 g of 1,5-diamino-anthraquinone and 8.8 g of orthoformic acid triethyl ester are heated to 145°–150° C. in 150 g of nitrobenzene for about 3 hours, during which the ethanol formed is distilled off over a bridge and the disappearance of the starting material is followed by thin layer chromatography. 13.9 g of 3-hydroxy-2-naphthoic acid 4-methylanilide are now added and the mixture is heated to 140°–150° C. until the formation of the pigment has ended, which requires about 4 hours. The pigment, which has crystallised as orange-coloured prisms, is then filtered off at 120° C. and washed with hot nitrobenzene and methanol, and, after drying at 100° C., 18.3 g (90.9% of theory) of the bluish-tinged red pigment of the formula

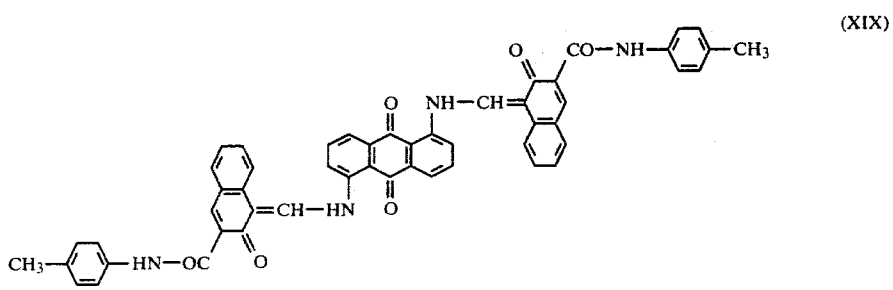

are obtained.

Calculated: N 6.9. Found: N 7.05.

Using 3-hydroxy-2-naphthoic acid or the 3-hydroxy-2-naphthoic acid arylides of the formula (VIII)

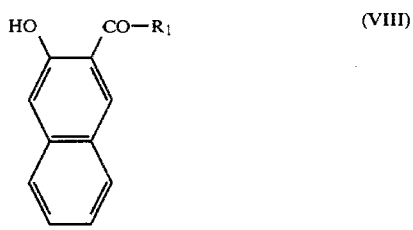

listed in the table which follows, and 1,5-diamino-anthraquinone, pigments corresponding to that of the formula XIX with the colour shades indicated are obtained by the process described in Example 38:

TABLE 4

| Example | $R_1$ | Colour shade |
|---|---|---|
| 39 | OH | red |
| 40 | —HN—⌬ | bluish-tinged red |
| 41 | —HN—⌬—$C_2H_5$ | bluish-tinged red |
| 42 | —HN—⌬—NH—$SO_2$—⌬ | bluish-tinged red |
| 43 | —HN—⌬—$OCH_3$ | bluish-tinged red |
| 44 | —HN—⌬—$CH_3O$ | bluish-tinged red |
| 45 | —HN—⌬—$NO_2$ | reddish-tinged grey |
| 46 | —HN—⌬⌬ | bluish-tinged red |

EXAMPLE 47

5.9 g of 1,4-diamino-anthraquinone and 8.8 g of orthoformic acid triethyl ester are heated to 145°–150° C. in 150 g of nitrobenzene for about 3 hours, during which the ethanol formed is distilled off over a bridge and the disappearance of the starting material is followed by thin layer chromatography. 13.9 g of 3-hydroxy-2-naphthoic acid 4-methylanilide are now added and the mixture is heated to 140°–150° C. until the formation of the pigment has ended. The pigment, which has crystallised as attractive blue-black needles, is then filtered off at 120° C. and washed with hot nitrobenzene and methanol, and, after drying at 100° C., 17.6 g (87.5% of theory) of the violet pigment of the formula

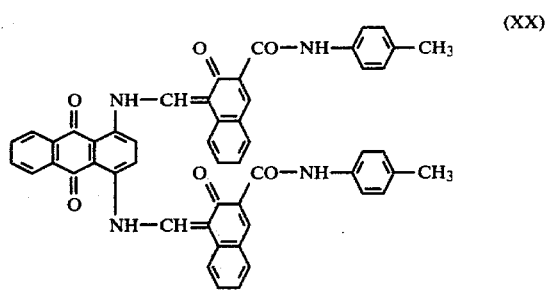

are obtained.

Calculated: N 6.9. Found: N 7.0.

Using 3-hydroxy-2-naphthoic acid or the 3-hydroxy-2-naphthoic acid arylides of the formula (VIII)

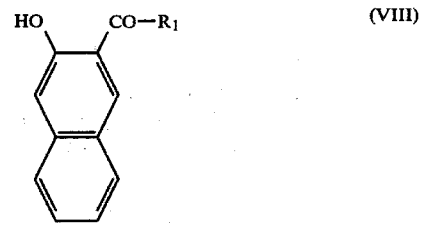

listed in the table which follows, and 1,4-diamino-anthraquinone, pigments corresponding to that of the formula XX with the colour shades indicated are obtained by the process described in Example 47.

TABLE 5

| Example | $R_1$ | Colour shade |
|---|---|---|
| 48 | OH | bluish-tinged violet |
| 49 | —HN—⌬ | bluish-tinged violet |
| 50 | —HN—⌬—$CH_3$ | violet |
| 51 | —HN—⌬—$NO_2$ | reddish-tinged violet |

TABLE 5-continued

| Example | R₁ | Colour shade |
|---|---|---|
| 52 | —NH—⟨⟩—OCH₃ | reddish-tinged violet |
| 53 | —HN—(naphthyl) | bluish-tinged violet |

EXAMPLE 55

6.7 g of 1,5-diamino-4,8-dihydroxy-anthraquinone and 8.8 g of orthoformic acid triethyl ester are heated to 145°–150° C. in 150 g of nitrobenzene for about 3 hours, during which the ethanol formed is distilled off over a bridge and the disappearance of the starting material is followed by thin layer chromatography. 13.4 g of 3-hydroxy-2-naphthoic acid anilide are now added and the mixture is heated to 160°–170° C. until the formation of the pigment has ended. The pigment, which has crystallised as green-blue prisms, is then filtered off at 120° C. and washed with hot nitrobenzene and methanol, and, after drying at 100° C., 18.7 g (92.3% of theory) of the greenish-tinged grey pigment of the formula

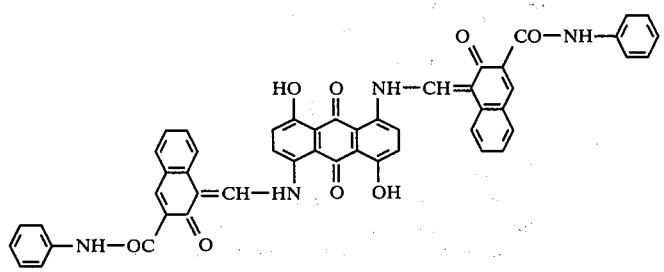

are obtained.

Calculated: N 6.87; O 15.7. Found: N 7.60; O 15.85.

Using 3-hydroxy-2-naphthoic acid or the 3-hydroxy-2-naphthoic acid aryld of the formula (VIII)

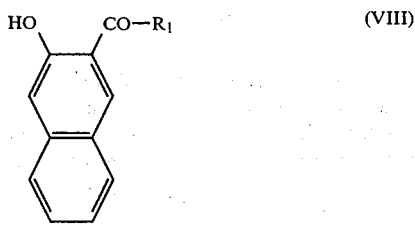

listed in the table which follows, and 1,5-diamino-4,8-dihydroxy-anthraquinone, pigments corresponding to that of the formula XXI with the colour shades indicated are obtained by the process described in Example 55:

TABLE 6

| Example | R₁ | Colour shade |
|---|---|---|
| 56 | OH | grey |
| 57 | —HN—⟨⟩—CH₃ | strongly greenish-tinged grey |
| 58 | —HN—⟨⟩ (with CH₃ ortho) | strongly greenish-tinged grey |
| 59 | —HN—⟨⟩—NO₂ | bluish-tinged grey |
| 60 | —HN—⟨⟩ (H₃C, Cl) | greenish-tinged grey |
| 61 | —HN—⟨⟩—Cl (H₃C) | greenish-tinged grey |
| 62 | —HN—⟨⟩—CH₃ (H₃C) | strongly greenish-tinged grey |
| 63 | —HN—⟨⟩ (CH₃O) | greenish-tinged grey |
| 64 | —HN—⟨⟩—Cl (CH₃O) | grey |
| 65 | —HN—⟨⟩—Br (CH₃O) | grey |
| 66 | —HN—⟨⟩—OCH₃ (H₃C) | greenish-tinged grey |

Pigments with excellent properties and similar colour shades are obtained when 1,8-diamino-4,5-dihydroxy-anthraquinone, 1,5-diamino-4,8-dihydroxy-x-bromo-anthraquinone or 1,8-diamino-4,5-dihydroxy-x-bromo-anthraquinone is employed in Examples 55–66 instead of the 1,5-diamino-4,8-dihydroxy-anthraquinone used therein.

EXAMPLE 67

(a) 8 g of the finely divided pigment obtained according to Example 1a are ground with a stoving lacquer consisting of 25 g of a coconut oil alkyd resin (40% of coconut oil), 10 g of a melamine resin, 50 g of toluene and 7 g of glycol monomethyl ether on an automatic Hoover-Muller grinding machine. The mixture is applied to the substrate to be lacquered, the lacquer is hardened by stoving at 130° C. and bluish-tinged red lacquerings of very good fastness to overlacquering and outstanding fastness to light and weathering are obtained.

Pigmented stoving lacquers with the same fastness properties are obtained when 15–25 g of the alkyd resin indicated or of an alkyd resin based on cottonseed oil, dehydrated castor oil, castor oil or synthetic fatty acids are used and 10–15 g of the melamine resin mentioned or of a condensation product of formaldehyde with urea or with benzoguanamine are employed instead of the indicated amount of melamine resin.

(b) If 1 to 10 g of a mixture of titanium dioxide (rutile type) with the pigment indicated in Example 67a, in the ratio 0.5–50:1, is ground into the lacquer indicated in Example 67a, instead of the amount of pigment indicated, and the further processing is the same, lacquerings with the same fastness properties and a bluish-tinged red colour shade which is shifted towards white with increasing titanium dioxide content are obtained.

EXAMPLE 68

6 g of the finely divided pigment according to Example 1a are ground into 100 g of a nitrocellulose lacquer which consists of 44 g of collodion cotton (low viscosity, 35%, butanol-moist), 5 g of dibutyl phthalate, 40 g of ethyl acetate, 20 g of toluene, 4 g of n-butanol and 10 g of glycol monomethyl ether. After brushing on and drying, bluish-tinged red lacquerings of outstanding fastness to light and overlacquering are obtained. The same results are obtained when nitrocellulose lacquers with a nitrocellulose content of 10–15 g, a plasticiser content of 5–10 g and a solvent mixture of 70–85 g are used, aliphatic esters, such as ethyl acetate and butyl acetate, and aromatic compounds, such as toluene and xylene, and relatively small proportions of aliphatic ethers, such as glycol ether, and alcohols, such as butanol, preferably being used. By plasticisers there may be understood, for example: phthalic acid esters, such as dioctyl phthalate or dibutyl phthalate, esters of phosphoric acid or castor oil, alone or in combination with oil-modified alkyd resins.

Lacquerings with similar fastness properties are obtained using other spirit lacquers. Zapon lacquers and nitrocellulose lacquers which dry physically, air-drying oil varnishes, synthetic resin lacquers and nitrocellulose combination lacquers or oven-drying and air-drying epoxide resin lacquers, optionally in combination with urea resins, melamine resins, alkyd resins or phenolic resins.

EXAMPLE 69

5 g of the finely divided pigment according to Example 1a are ground into 100 g of an unsaturated polyester resin which dries without paraffin, in a porcelain ball mill. 10 g styrene, 59% of a melamine/formaldehyde resin and 1 g of a paste consisting of 40 g of cyclohexanone peroxide and 60% of dibutyl phthalate are stirred thoroughly with the ground material, and finally 4 g of drier solution (10% strength cobalt naphthenate in white spirit) and 1 g of a silicone oil solution (1% strength in xylene) are admixed. The mixture is applied to primed wood and a high-gloss, water-resistant bluish-tinged red lacquering which is fast to weathering and has outstanding fastness to light is obtained.

If amine-curing epoxide resin lacquers with dipropylenediamine as the amino component are used instead of the reactive lacquer based on unsaturated polyester resins, bluish-tinged red lacquerings of outstanding fastness to weathering and effluorescence are obtained.

EXAMPLE 70

100 g of a 65% strength solution of an aliphatic polyester, with about 8% of free hydroxyl groups, in glycol monomethyl ether-acetate are ground with 5 g of the pigment obtained according to Example 1a and the ground material is then mixed thoroughly with 44 g of a 67% strength solution of the reaction product of 1 mol of trimethylolpropane and 3 mols of toluylene diisocyanate. Without impairing the pot life, application of the mixture and reaction of the components results in high-gloss bluish-tinged red polyurethane lacquerings of outstanding fastness to effluorescence, light and weathering.

Pigmentations of similar fastness are obtained using other two-component lacquers based on aromatic or aliphatic isocyanates and polyethers or polyesters containing hydroxyl groups, and with polyisocyanate lacquers which give polyurea lacquerings which dry in the presence of moisture.

EXAMPLE 71

5 g of a fine paste obtained by kneading 50 g of the pigment obtained according to Example 1a with 15 g of an aryl polyglycol ether emulsifier and 35 g of water are mixed with 10 g of barite, as a filler, 10 g of titanium dioxide (rutile type), as a white pigment, and 40 g of an aqueous emulsion paint containing about 50% of polyvinyl acetate. The paint is brushed onto a substrate and, after drying, bluish-tinged red paint films of very good fastness to lime and cement and outstanding fastness to weathering and light are obtained.

The fine paste obtained by kneading is likewise suitable for pigmenting clear polyvinyl acetate emulsion paints, for emulsion paints which contain copolymers of styrene and maleic acids as binders, and emulsion paints based on polyvinyl propionate, polymethacrylate or butadiene/styrene.

EXAMPLE 72

10 g of the pigment paste mentioned in Example 71 are mixed with a mixture of 5 g of chalk and 5 g of a 20% strength size solution. A bluish-tinged red wallpaper paint is obtained with which coatings of outstanding fastness to light are achieved. For the preparation of the pigment paste, it is also possible to use other non-ionic emulsifiers, such as the reaction products of nonylphenyol and ethylene oxide, or ionic wetting agents, such as the sodium salts of alkylarylsulphonic acids, for example of dinaphthylmethanedisulphonic acid, sodium salts of substituted sulpho-fatty acid esters and sodium salts of paraffinsulphonic acids, in combination with alkyl polyglycol ethers.

EXAMPLE 73

A mixture of 65 g of polyvinyl chloride, 35 g of diisooctyl phthalate, 2 g of dibutyl-tin mercaptide, 0.5 g of titanium dioxide and 0.5 g of the pigment from Example 1a is compounded on a mixing mill at 165° C. An intensively bluish-tinged red-coloured mass is obtained, which can be used for the production of films or shaped articles. The coloration is distinguished by outstanding fastness to light and very good fastness to plasticisers.

EXAMPLE 74

0.2 g of the pigment according to Example 1a is mixed with 100 g of polyethylene granules, polypropylene granules or polystyrene granules. The mixture can either be injection-moulded directly in an injection-moulding machine at 220° to 280° C., or processed in an extruder to give coloured rods or on a mixing mill to give coloured hides. The rods or hides are appropriately granulated and injection-moulded in an injection-moulding machine.

The bluish-tinged red moulded articles have very good fastness to light and migration. Synthetic polyamides of caprolactam or adipic acid and hexamethylenediamine, or the condensation products of terephthalic acid and ethylene glycol can be coloured in a similar manner at 280°–300° C., if appropriate under a nitrogen atmosphere.

EXAMPLE 75

1 g of the pigment according to Example 1a, 10 g of titanium dioxide (rutile type) and 100 g of a copolymer, present in powder form, based on acrylonitrile/-butadiene/styrene are mixed, and compounded on a mixing mill at 140°–180° C. A bluish-tinged red-coloured hide is obtained, which is granulated and injection-moulded in an injection-moulding machine at 200°–250° C. Bluish-tinged red moulded articles of very good fastness to light and migration and excellent stability to heat are obtained.

Plastics based on cellulose acetate, cellulose butyrate and mixtures thereof are coloured, with similar fastness properties, in a similar manner, but at temperatures of 180°–220° C. and without the addition of titanium dioxide.

EXAMPLE 76

0.2 g of the pigment according to Example 1a, in the finely divided form, is mixed, and processed to granules, with 100 g of a plastic based on polycarbonate in an extruder or in a kneading screw at 250°–280° C. Bluish-tinged red, transparent granules of outstanding fastness to light and stability to heat are obtained.

EXAMPLE 77

90 g of a slightly branched polypropylene glycol with a molecular weight of 2,500 and a hydroxyl number of 56, 0.25 g of endoethylenepiperazine, 0.3 g of tin-II octoate, 1.0 g of a polyether-siloxane, 3.5 g of water and 12.0 g of a ground mixture of 10 g of the pigment according to Example 1a in 50 g of the polypropylene glycol indicated are mixed thoroughly with one another and the mixture is then intimately mixed with 45 g of toluylene diisocyanate (80% of the 2,4-isomer and 20% of the 2,6-isomer) and the final mixture is poured into a mould. After 6 seconds the mixture becomes turbid and foaming takes place. After 70 seconds, an intensively bluish-tinged red-coloured, soft polyurethane foam has formed, the pigmentation of which has outstanding fastness to light.

EXAMPLE 78

90 g of a slightly branched polyester obtained from adipic acid, diethylene glycol and trimethylolpropane and with a molecular weight of 2,000 and a hydroxyl number of 60 are mixed with the following components: 1.2 g of dimethylbenzylamine, 2.5 g of sodium castor oil-sulphate, 2.0 g of an oxyethylated, benzylated oxydiphenyl, 1.75 g of water and 12 g of a paste prepared by grinding 10 g of the pigment according to Example 1a in 50 g of the polyester indicated above. After mixing, 40 g of toluylene diisocyanate (65% of the 2,4-isomer and 35% of the 2,6-isomer) are stirred in with stirring and the mixture is poured into a mould and foamed. After 60 seconds, a bluish-tinged red-coloured, soft polyurethane foam has formed, the coloration of which is distinguished by very good fastness to light.

EXAMPLE 79

Bluish-tinged red offset prints of high billiancy and good depth of colour and with very good fastness to light and lacquering, are obtained with a printing paste prepared by grinding 35 g of the pigment according to Example 1a and 65 g of linseed oil and adding 1 g of a siccative (Co naphthenate, 50% strength in white spirit). Using this printing paste in letterpress printing, collotype printing, lithographic printing or die stamping leads to bluish-tinged red prints with similar fastness properties. If the pigment is used for colouring tinplate printing pastes or low-viscosity gravure printing pastes or printing inks, bluish-tinged red prints with similar fastness properties are obtained.

EXAMPLE 80

A print paste is prepared from 10 g of the fine pigment paste indicated in Example 71, 100 g of 3% strength tragacanth gum, 100 g of an aqueous 50% strength egg albumin solution and 25 g of a non-ionic wetting agent. A textile fibre fabric is printed, and steamed at 100° C., and a bluish-tinged red print which is distinguished by outstanding fastness properties, in particular fastness to light, is obtained. Further binders which can be used for fixing the pigment to the fibre, for example those based on synthetic resin, or British gum or cellulose glycolate, can be employed in the printing mixture instead of the tragacanth gum and egg albumin.

EXAMPLE 81

A mixture of 100 g of light crepe, 2.6 g of sulphur, 1 g of stearic acid, 1 g of mercaptobenzthiazole, 0.2 g of hexamethylenetetramine, 5 g of zinc oxide, 60 g of chalk and 2 g of titanium dioxide (anatase type) is compounded on a mixing mill at 50° C. and with 2 g of the pigment obtained according to Example 1a, and the mixture is then vulcanised at 140° C. for 12 minutes. A bluish-tinged red-coloured vulcanised product of very good fastness to light is obtained.

EXAMPLE 82

100 g of a 20% strength aqueous paste of the pigment according to Example 1a, prepared, for example, by dissolving the colorant in 96% strength sulphuric acid, discharging the solution onto ice and filtering off the precipitate and washing it with water until neutral, are added to 22.5 l of an aqueous, approximately 9% strength viscose solution in a stirrer. The coloured mass is stirred for 15 minutes and then degassed and subjected to a spinning and desulphurisation process. Bluish-tinged red filaments or films with very good fastness to light are obtained.

EXAMPLE 83

10 kg of a paper pulp containing 4 g of cellulose per 100 g are treated in a hollander for about 2 hours. During this period, at intervals of a quarter of an hour, 4 g of rosin size, then 30 g of an approximately 15% strength pigment dispersion obtained by grinding 4.8 g of the pigment obtained according to Example 1a with 4.8 g of dinaphthalmethanedisulphonic acid and 22 g of water in a ball mill, and finally 5 g of aluminium sulphate are added.

After finishing on the paper machine, bluish-tinged red-coloured paper of outstanding fastness to light is obtained.

EXAMPLE 84

The red-pigmented paper produced according to Example 83 is impregnated with a 55% strength solution of a urea/formaldehyde resin in n-butanol and baked at 140° C. Bluish-tinged red laminated paper of very good fastness to migration and outstanding fastness to light is obtained.

Laminated paper with similar fastness properties is obtained by laminating a paper which has been printed with a printing paste, by the gravure printing process, which contains the red fine pigment paste indicated in Example 66 and water-soluble or saponifiable binders.

EXAMPLE 85

20 g of the pigment obtained according to Example 1a are finely dispersed in 50 g of dimethylformamide in a bead mill, using a dispersing auxiliary consisting of 50 g of a 10% strength solution of polyacrylonitrile in dimethylformamide. The pigment concentrate thus obtained is added, in a known manner, to spinning solutions of polyacrylonitrile and the solutions are homogenised and then spun to filaments by known dry or wet spinning processes.

Bluish-tinged red-coloured filaments are obtained, the colorations of which are distinguished by very good fastness to rubbing, washing, migration, heat, light and weathering.

We claim:

1. An anthraquinone pigment of the formula

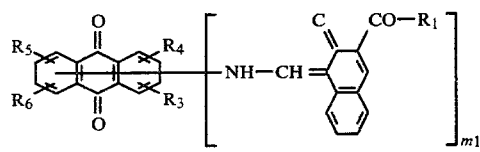

wherein $R_1$ denotes a hydroxyl group or a radical of the formula

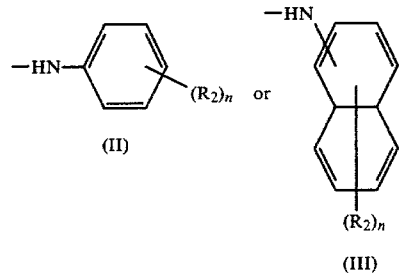

wherein $R_2$ represents halogen, $C_1$–$C_4$-alkyl, $C_1$–$C_4$ alkoxy, nitro, trifluoromethyl, cyano, unsubstituted carbamoyl, carbamoyl substituted by a member selected from the group consisting of $C_1$–$C_4$-alkyl, phenyl which is optionally substituted by $C_1$–$C_4$-alkyl, $C_1$–$C_4$-alkoxy, fluorine, chlorine, bromine or nitro and benzyl, unsubstituted sulphamoyl, sulphamoyl substituted by a member selected from the group consisting of $C_1$–$C_4$-alkyl, phenyl which is optionally substituted by $C_1$–$C_4$-alkyl, $C_1$–$C_4$-alkoxy, fluorine, chlorine, bromine or nitro and benzyl, acylamino, arylamino, $C_1$–$C_4$-alkylsulphonylamino, phenylsulphonylamino which is optionally substituted by $C_1$–$C_4$-alkyl, $C_1$–$C_4$-alkoxy, fluorine, chlorine, bromine or nitro, unsubstituted benzylsulphonylamino or benzylsulphonylamino or benzylsulphonylamino substituted by $C_1$–$C_4$-alkyl, $C_1$–$C_4$-alkoxy, fluorine, chlorine, bromine or nitro, and n represents 0, 1, 2, 3, or 4, $m_1$ represents an integer between 1 and 4, $R_3$ denotes hydrogen, halogen, nitro, $C_1$–$C_4$-alkyl, $C_1$–$C_4$ alkoxy, $C_1$–$C_4$-alkylamino, benzylamino, cyclohexylamino, $C_1$–$C_4$-alkylmercapto, phenylmercapto which is optionally substituted by $C_1$–$C_4$ alkyl, $C_1$–$C_4$ alkoxy, fluorine, chlorine, bromine, or nitro, $C_1$–$C_4$ alkyl carbonyl, $C_1$–$C_4$ alkoxycarbonyl, phenylamino which is optionally substituted by $C_1$–$C_4$-alkyl, $C_1$–$C_4$-alkoxy, chlorine or nitro, carbamoyl which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine, bromine or nitro, carboxyl, hydroxyl, $C_1$–$C_4$-alkylcarbonylamino, benzoylamino which is optionally substituted by $C_1$–$C_4$-alkyl, $C_1$–$C_4$-alkoxy, chlorine, bromine, or nitro, $C_1$–$C_4$-alkylsulphonylamine or phenylsulphonylamino which is optionally substituted by $C_1$–$C_4$-alkyl, $C_1$–$C_4$-alkoxy, fluorine, chlorine, bromine or nitro, $R_4$ denotes hydrogen, chlorine or hydroxyl, $R_5$ denotes hydrogen, halogen, nitro, $C_1$–$C_4$-alkyl, $C_1$–$C_4$-alkoxy, $C_1$–$C_4$-alkylamino, $C_1$–$C_4$-alkylmercapto, phenylmercapto which is optionally substituted by $C_1$–$C_4$-alkyl, $C_1$–$C_4$-alkoxy, fluorine, chlorine, bromine, or nitro, $C_1$–$C_4$-alkoxycarbonyl, $C_1$–$C_4$-alkylcarbonyl, benzylamino, cyclohexylamino, phenylamino which is optionally substituted by $C_1$–$C_4$-alkyl, $C_1$–$C_4$-alkoxy, chlorine, bromine or nitro, carboxyl, hydroxyl, carbamoyl which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine, bromine or nitro, $C_1$–$C_4$-alkyl, carbonylamino, benzoylamino which is optionally substituted by $C_1$–$C_4$-alkyl, $C_1$–$C_4$ alkoxy, chlorine, bromine, or nitro, $C_1$–$C_4$ alkylsulphonylamino or phenylsulphonylamino which is optionally substituted by $C_1$–$C_4$-alkyl, $C_1$–$C_4$-alkoxy, fluorine, chlorine, bromine or nitro and $R_6$ denotes hydrogen, halogen, or hydroxyl.

2. Anthraquinone pigments of the formula

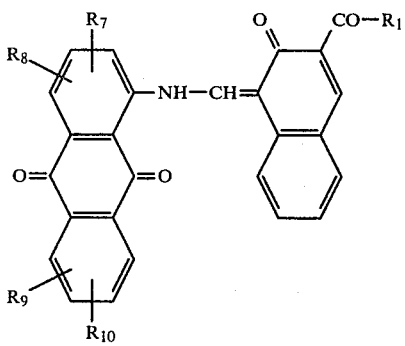

wherein
R₁ denotes a hydroxyl group or a radical of the formula

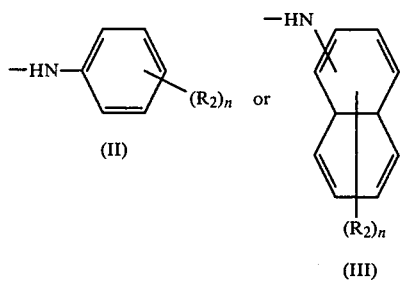

wherein
R₂ represents a substituent and
n represents 0, 1, 2, 3, or 4, and
R₇, R₈, R₉ and R₁₀ designate hydrogen, chlorine, bromine, carboxyl, hydroxyl, $C_1$-$C_4$-alkoxycarbonyl, carbamoyl, $C_1$-$C_4$-alkylcarbonylamino, benzoylamino which is optionally substituted by 1 or 2 nitro groups or 1 to 5 chlorine or bromine atoms, $C_1$-$C_4$-alkylsulphonylamino, phenylsulphonylamino which is optionally substituted by methyl, methoxy or chlorine or a radical of the formula

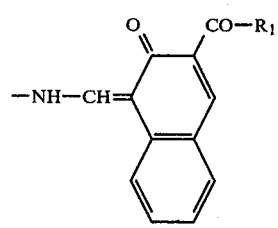

in which
R₁ has the meaning indicated above.

3. Process for pigmenting an organic macromolecular substance which comprises adding a pigment according to claim 1 to said organic macromolecular substance.

4. A process for the preparation of an anthraquinone derivative which comprises condensing an aminoanthraquinone of the formula

in which
A represents the radical

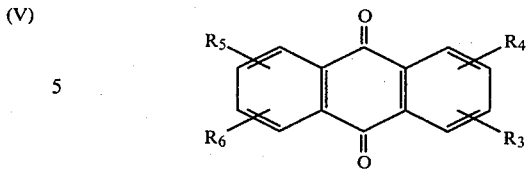

wherein
R₃ denotes hydrogen, halogen, nitro, $C_1$-$C_4$-alkyl, $C_1$-$C_4$-alkoxy, $C_1$-$C_4$-alkylamino, benzylamino, cyclohexylamino, $C_1$-$C_4$-alkylmercapto, phenylmercapto which is optionally substituted by $C_1$-$C_4$-alkyl, $C_1$-$C_4$-alkoxya, fluorine, chlorine, bromine or nitro, $C_1$-$C_4$-alkylcarbonyl, $C_1$-$C_4$-alkoxycarbonyl, phenylamino which is optionally substituted by $C_1$-$C_4$-alkyl, $C_1$-$C_4$-alkoxy, chlorine or nitro, carbamoyl which is optionally monosubstituted or disubstituted by $C_1$-$C_4$-alkyl, benzyl or phenyl optionally substituted by $C_1$-$C_4$-alkyl, $C_1$-$C_4$-alkoxy, fluorine, chlorine, bromine or nitro, carboxyl, hydroxyl, $C_1$-$C_4$-alkylcarbonylamino, benzoylamino which is optionally substituted by $C_1$-$C_4$-alkyl, $C_1$-$C_4$-alkoxy, chlorine, bromine or nitro, $C_1$-$C_4$-alkylsulphonylamino or phenylsulphonylamino which is optionally substituted by $C_1$-$C_4$-alkyl, $C_1$-$C_4$-alkoxy, fluorine, chlorine, bromine or nitro,
R₄ denotes hydrogen, chlorine or hydroxyl,
R₅ denotes hydrogen, halogen, nitro, $C_1$-$C_4$-alkyl, $C_1$-$C_4$-alkoxy, $C_1$-$C_4$-alkylamino, $C_1$-$C_4$-alkylmercapto, phenylmercapto which is optionally substituted by $C_1$-$C_4$-alkyl, $C_1$-$C_4$-alkoxy, fluorine, chlorine, bromine or nitro, $C_1$-$C_4$-alkoxy carbonyl, $C_1$-$C_4$-alkylcarbonyl, benzylamino, cyclohexylamino, phenylamino which is optionally substituted by $C_1$-$C_4$-alkyl, $C_1$-$C_4$-alkoxy, chlorine, bromine, or nitro, carboxyl, hydroxyl, carbamoyl which is optionally monosubstituted or disubstituted by $C_1$-$C_4$-alkyl, benzyl or phenyl, it being possible for m to be substituted by $C_1$-$C_4$-alkyl, $C_1$-$C_4$-alkoxy, fluorine, chlorine, bromine or nitro, $C_1$-$C_4$-alkyl, carbonylamino, benzoylamino which is optionally substituted by $C_1$-$C_4$-alkyl, $C_1$-$C_4$-alkoxy, chlorine, bromine or nitro, $C_1$-$C_4$-alkylsulphonylamino or phenylsulphonylamino which is optionally substituted by $C_1$-$C_4$-alkyl, $C_1$-$C_4$-alkoxy, fluorine, chlorine, bromine, or nitro,
R₆ denotes hydrogen, halogen, or hydroxyl,
m denotes an integer with 4-alkoxymethylene-3-oxy-3,4-dihydro-2-naphthoic acid or 4-alkoxy methylene-3-oxy-3,4-dihydro-2-naphthoic acid arylides of the formula

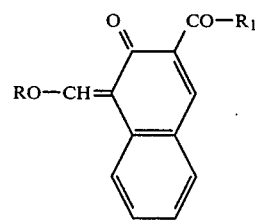

wherein
R represents a $C_1$-$C_4$-alkyl group and $R_1$ denotes a hydroxyl group or a radical of the formula

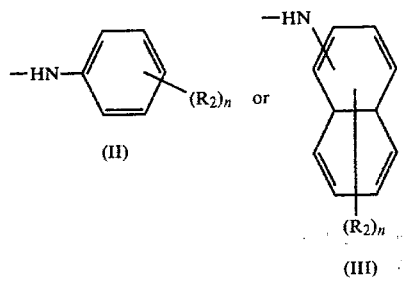

wherein
$R_2$ represents a substituent and
n represents 0, 1, 2, 3, or 4,
in an organic reaction medium at 100°–220° C.

5. A process for the preparation of an anthraquinone derivative which comprises condensing a formimino-ester of an amino-anthraquinone of the formula

wherein
A is represented by the formula

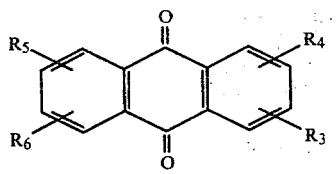

wherein
$R_3$ denotes hydrogen, halogen, nitro, $C_1$–$C_4$-alkyl, $C_1$–$C_4$-alkoxy, $C_1$–$C_4$-alkylamino, benzylamino, cyclohexylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, $C_1$–$C_4$-alkylcarbonyl, $C_1$–$C_4$-alkoxycarbonyl, phenylamino which is optionally substituted by $C_1$–$C_4$-alkyl, $C_1$–$C_4$-alkoxy, chlorine, or nitro, carbamoyl which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine, bromine or nitro, carboxyl, hydroxyl, $C_1$–$C_4$-alkylcarbonylamino, benzoylamino which is optionally substituted by $C_1$–$C_4$-alkyl, $C_1$–$C_4$-alkoxy, chlorine, bromine or nitro, $C_1$–$C_4$-alkylsulphonylamino or phenylsulphonylamino which is optionally substituted by $C_1$–$C_4$-alkyl, $C_1$–$C_4$-alkoxy, fluorine, chlorine, bromine or nitro, $R_4$ denotes hydrogen, chlorine or hydroxyl, $R_5$ denotes hydrogen, halogen, nitro, $C_1$–$C_4$-alkyl, $C_1$–$C_4$-alkoxy, $C_1$–$C_4$-alkylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, $C_1$–$C_4$-alkoxy carbonyl, $C_1$–$C_4$-alkylcarbonyl, benzylamino, cyclohexylamino, phenylamino which is optionally substituted by $C_1$–$C_4$-alkyl, $C_1$–$C_4$-alkoxy, chlorine, bromine or nitro, carboxyl, hydroxyl, carbamoyl which is optionally monosubstituted or disubstituted by $C_1$–$C_4$-alkyl, benzyl or phenyl, it being possible for m to be substituted by $C_1$–$C_4$-alkyl, $C_1$–$C_4$-alkoxy, fluorine, chlorine, bromine or nitro, $C_1$–$C_4$-alkyl, carbonylamino, benzoylamino which is optionally substituted by $C_1$–$C_4$-alkyl, $C_1$–$C_4$-alkoxy, chlorine, bromine or nitro, $C_1$–$C_4$-alkylsulphonylamino or phenylsulphonylamino which is optionally substituted by $C_1$–$C_4$-alkyl, $C_1$–$C_4$-alkoxy, fluorine, chlorine, bromine, or nitro, $R_6$ denotes hydrogen, halogen, or hydroxyl, m = an integer, R denotes a $C_1$–$C_4$ alkyl group, with a 3-hydroxy-2-naphthoic acid or 3-hydroxy-2-nitrophthoic acid arylide of the formula

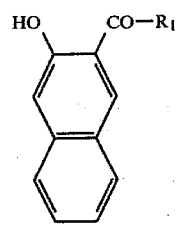

wherein
$R_1$ denotes a hydroxyl group or radical of the formula

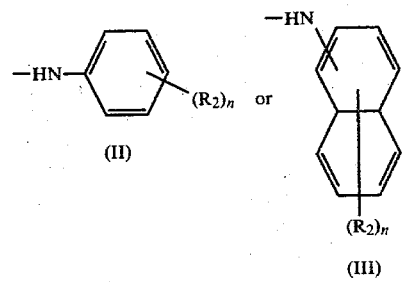

wherein
$R_2$ represents a substituent and
n represents 0, 1, 2, 3, or 4,
in an organic reaction medium at 100°–220° C.

6. A process for the preparation of an anthraquinone pigment which comprises condensing a formimidine of an aminoanthraquinone of the formula

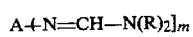

wherein
A denotes an anthraquinone moiety of the formula

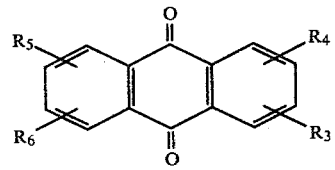

wherein
$R_3$ denotes hydrogen, halogen, nitro, $C_1$–$C_4$-alkyl, $C_1$–$C_4$-alkoxy, $C_1$–$C_4$-alkylamino, benzylamino, cyclohexylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, $C_1$–$C_4$-alkylcarbonyl, $C_1$–$C_4$-alkoxycarbonyl, phenylamino which is optionally substituted by $C_1$-$C_4$-alkyl, $C_1$-$C_4$-alkoxy, chlorine or nitro, carbamoyl which is optionally monosubstituted or disubstituted by $C_1$-$C_4$-alkyl, benzyl or phenyl, it being possible for phenyl to be substituted by $C_1$-$C_4$-alkyl, $C_1$-$C_4$-alkoxy, fluorine, chlorine, bromine or nitro, carboxyl, hydroxyl, $C_1$-$C_4$-alkylcarbonylamino, benzoylamino which is optionally substituted by $C_1$-$C_4$-alkyl, $C_1$-$C_4$-alkoxy, chlorine, bromine or nitro, $C_1$-$C_4$-alkylsulphonylamino or phenylsulphonylamino which is optionally substituted by $C_1$-$C_4$-alkyl, $C_1$-$C_4$-alkoxy, fluorine, chlorine, bromine or nitro, $R_4$ denotes hydrogen, chlorine or hydroxyl, $R_5$ denotes hydrogen, halogen, nitro, $C_1$-$C_4$-alkyl, $C_1$-$C_4$-alkoxy, $C_1$-$C_4$-alkylamino, $C_1$-$C_4$-alkylmercapto, phenylmercapto which is optionally substituted by $C_1$-$C_4$-alkyl, $C_1$-$C_4$-alkoxy, fluorine, chlorine, bromine or nitro, $C_1$-$C_4$-alkoxy carbonyl, $C_1$-$C_4$-alkylcarbonyl, benzylamino, cyclohexylamino, phenylamino which is optionally substituted by $C_1$-$C_4$-alkyl, $C_1$-$C_4$-alkoxy, chlorine, bromine or nitro, carboxyl, hydroxyl, carbamoyl which is optionally monosubstituted or disubstituted by $C_1$-$C_4$-alkyl, benzyl or phenyl, it being possible for m to be substituted by $C_1$-$C_4$-alkyl, $C_1$-$C_4$-alkoxy, fluorine, chlorine, bromine or nitro, $C_1$-$C_4$-alkyl, carbonylamino, benzoylamino which is optionally substituted by $C_1$-$C_4$-alkyl, $C_1$-$C_4$-alkoxy, chlorine, bromine or nitro, $C_1$-$C_4$-alkylsulphonylamino or phenylsulphonylamino which is optionally substituted by $C_1$-$C_4$-alkyl, $C_1$-$C_4$-alkoxy, fluorine, chlorine, bromine, or nitro, $R_6$ denotes hydrogen, halogen, or hydroxyl, m is an integer and R is an $C_1$-$C_4$ alkyl group with 3-hydroxy-2-naphthoic acid or a 3-hydroxy-2-naphthoic acid arylide of the formula

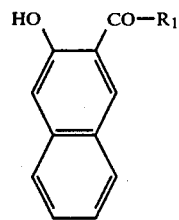

wherein $R_1$ denotes a hydroxyl group or a radical of the formula

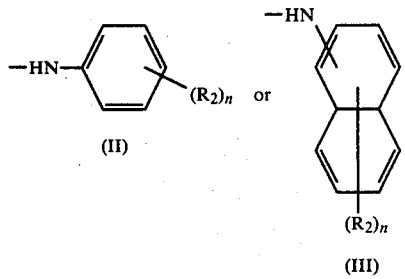

wherein $R_2$ represents a substituent and n represents 0, 1, 2, 3, or 4, in an organic reaction medium at 100°–220° C.

7. A process according to claim 4, wherein m represents 1 or 2.

8. A process according to claim 5, wherein m represents 1 or 2.

9. A process according to claim 6, wherein m represents 1 or 2.

10. An organic macromolecular material pigmented with an anthraquinone pigment according to claim 1.

* * * * *